April 23, 1929.  C. CIPRIANO  1,710,204
COMBINED SHOVEL AND SIFTER
Filed Sept. 25, 1928   3 Sheets-Sheet 1
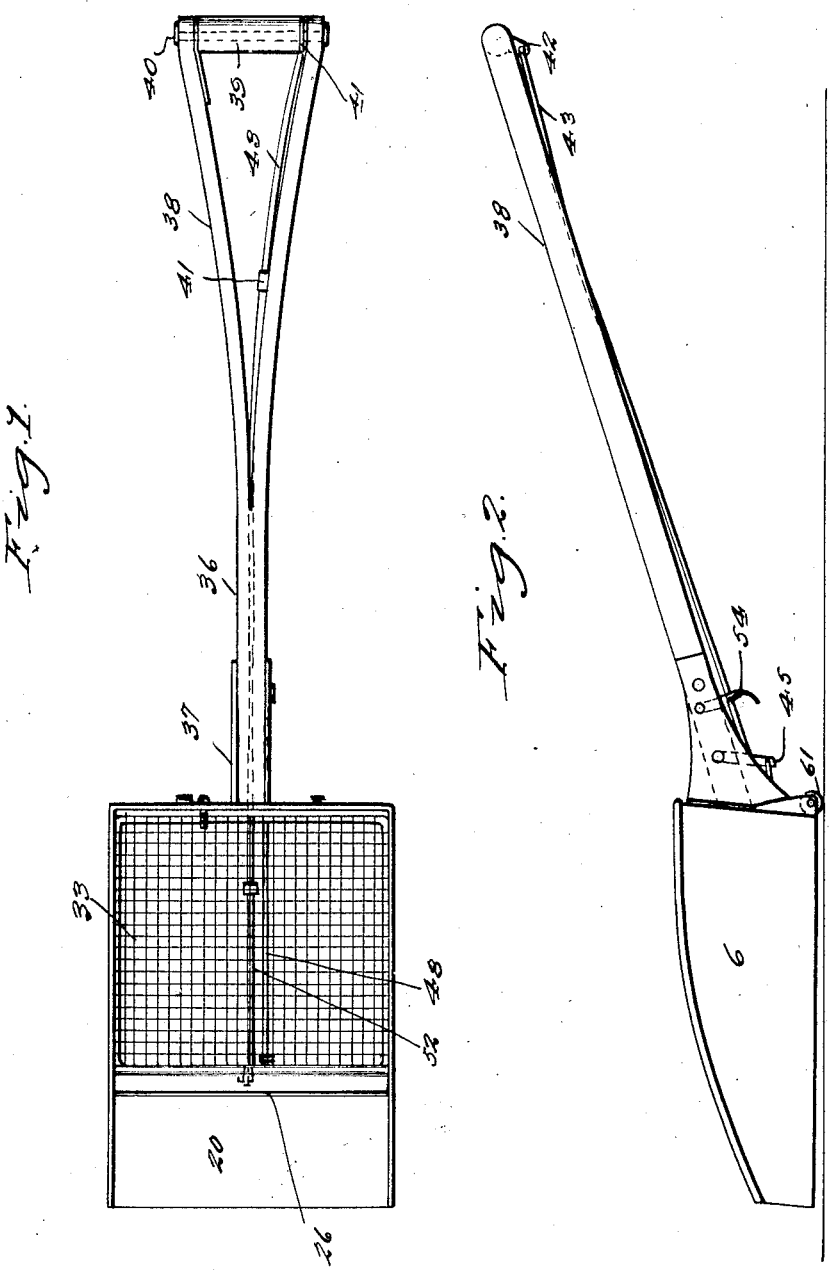
Inventor
Calogero Cipriano
By Clarence A. O'Brien
Attorney

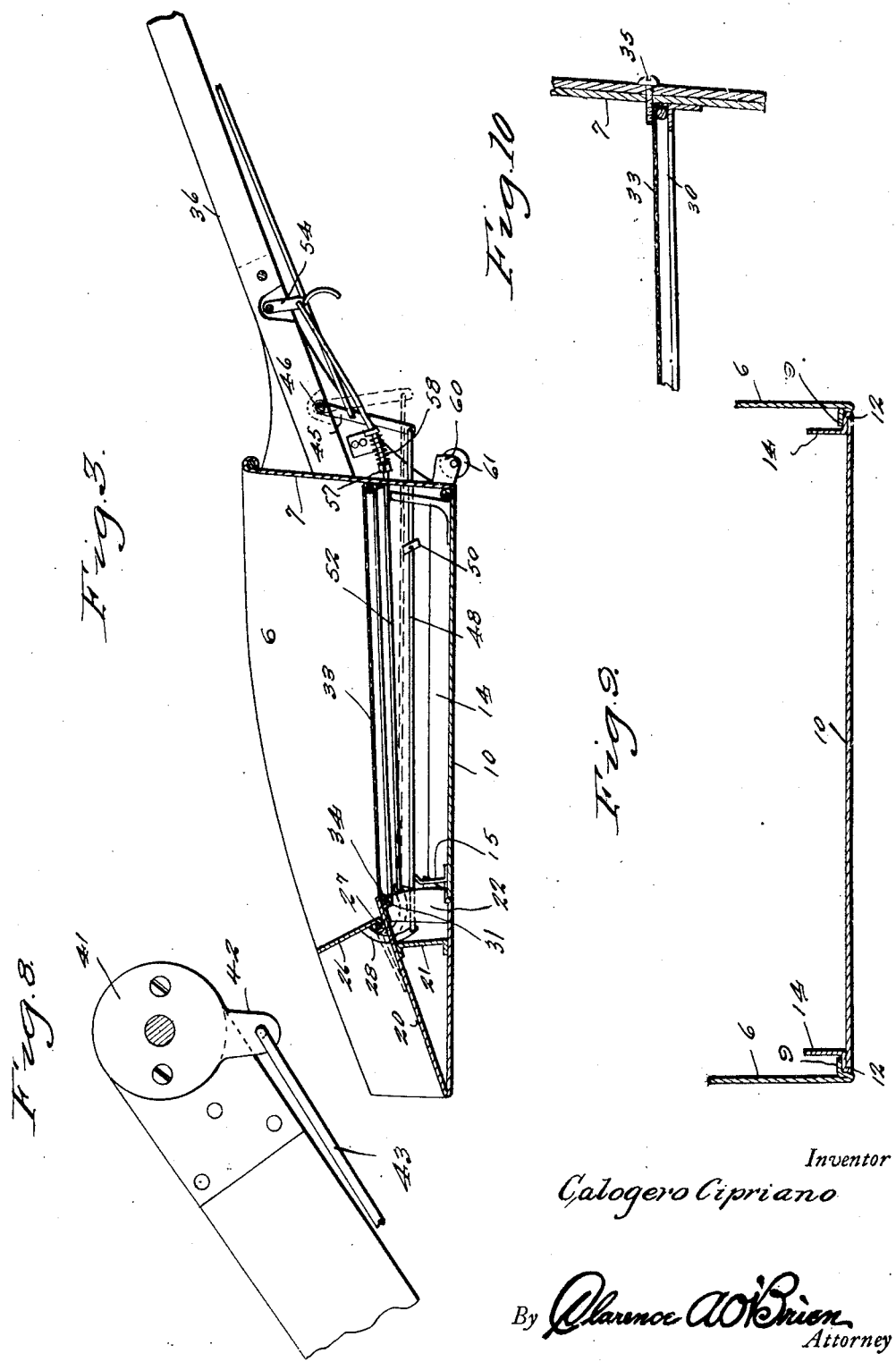

April 23, 1929.　　　C. CIPRIANO　　　1,710,204
COMBINED SHOVEL AND SIFTER
Filed Sept. 25, 1928　　　3 Sheets-Sheet 3
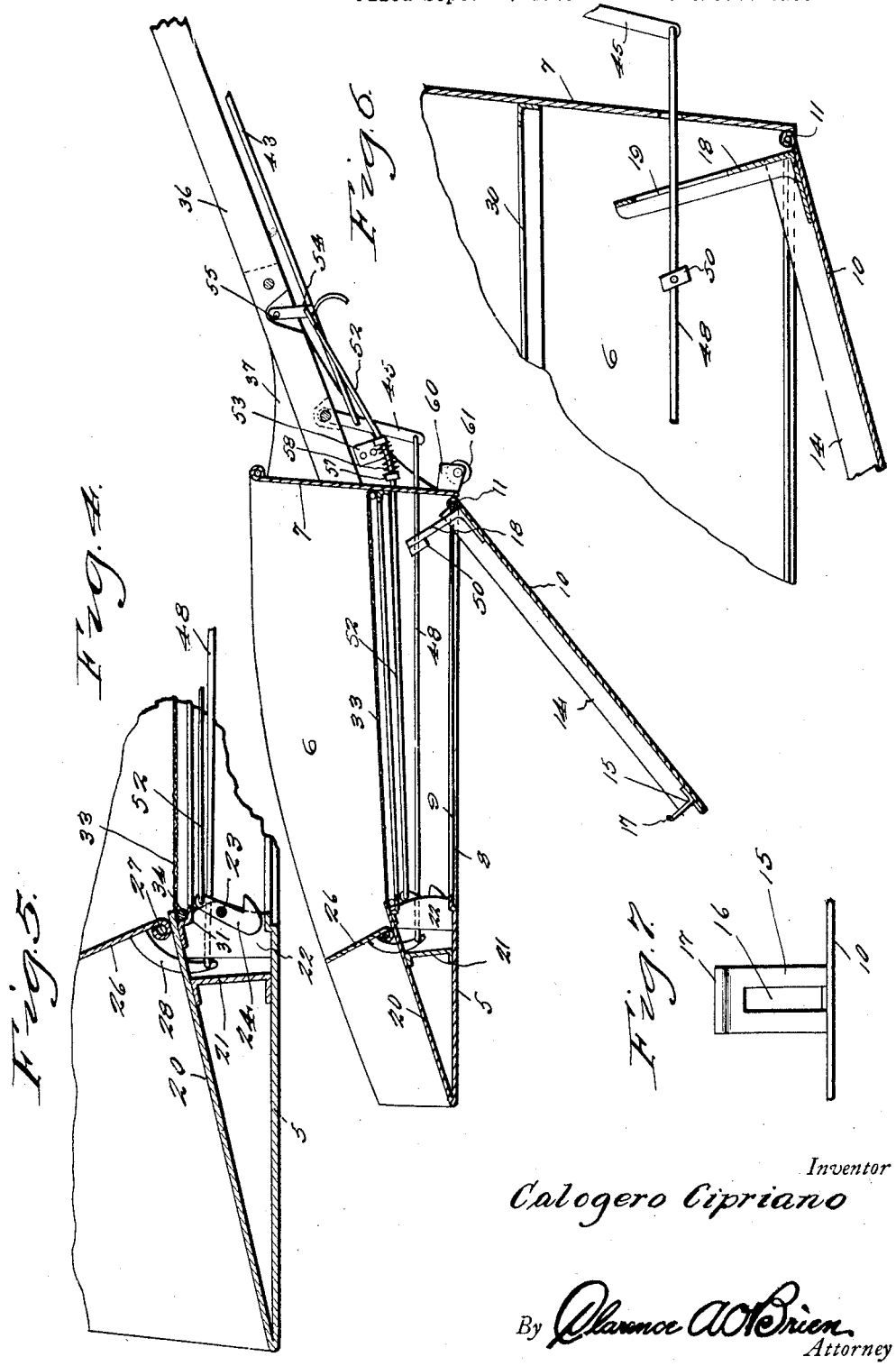
Inventor
Calogero Cipriano
By Clarence A. O'Brien
Attorney Patented Apr. 23, 1929.

1,710,204

UNITED STATES PATENT OFFICE.

CALOGERO CIPRIANO, OF MOUNT MORRIS, NEW YORK.

COMBINED SHOVEL AND SIFTER.

Application filed September 25, 1928. Serial No. 308,326.

The present invention relates generally to sifters particularly adapted for use in conjunction with ashes and has for its prime object to combine into a unitary structure the features of a shovel and sifter.

Another very important object of the invention resides in the provision of a combination structure of this nature wherein the parts are arranged in an exceedingly compact and convenient manner to afford ease of handling and manipulation.

Another very important object of the invention resides in the provision of a combination shovel and sifter wherein there is provided a hingedly mounted bottom plate operatively connected with a rotatable grip at the extremity of the handle so that the same may be manipulated without taking the hands off the handle.

A still further very important object of the invention resides in the provision of a combination shovel and sifter of this nature which is exceedingly simple in its construction, comparatively inexpensive in its manufacture, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the combination shovel and sifter embodying the features of this invention, Figure 2 is a side elevation thereof, Figure 3 is a vertical longitudinal section therethrough, Figure 4 is a similar view showing the bottom plate in an open position, Figure 5 is an enlarged detail vertical section through the forward portion of the device, Figure 6 is an enlarged detail section through the lower bottom portion of the device, Figure 7 is a detail view of the rigid keeper on the bottom plate, Figure 8 is a detail view showing the crank on the rotatable grip, Figure 9 is a detail transverse section through the device, and Figure 10 is an enlarged detail sectional view showing the screw for holding the sifter screen in place.

Referring to the drawing in detail it will be seen that I provide a shovel like structure including a bottom 5, side walls 6, and the rear walls 7. The bottom 5 is provided with a rectangular opening 8 with a stop flange 9 on the side and forward end thereof offset slightly upwardly.

A bottom plate 10 is hingedly mounted as at 11 on the bottom edge of the rear wall 9 to close the opening 8 and has side and front flanges 12 to abut flanges 9 and these flanges 12 merge into upstanding extensions 14.

A rigid L-shaped keeper 15 is fixed to the free end of the plate 10 to rise therefrom and the upstanding portion is provided with a slot 16 and the upper extremity thereof is curved as indicated at 17.

An arm 18 is rigidly mounted on the hinged end of the plate 10 to rise therefrom and has a longitudinal or vertically extending slot 19. An inclined platform 20 merges from the forward edge of the bottom 5 and extends rearwardly over the bottom to terminate approximately immediately above the forward edge of the opening 8.

A cross brace 21 is disposed between the bottom side and upper portion of the platform 20. A bar 22 rises from the bottom 5 adjacent the forward edge of the opening 8 and is fixed to the rear edge of the platform 20 and has pivotally mounted thereon as at 23 a latch 24 which engages the keeper 15 to hold the plate 10 in a closed position.

A slot 26 is hingedly mounted as at 27 above the rear end of the platform 20 and has an arm 28 rigidly attached thereto adjacent its hinged end and extending through the rear end of the platform 20.

The side and rear walls have mounted thereon ledges 30 at approximately the same level as the upper portion of the platform 20 and a ledge 31 is provided under the upper end of the platform 20. A screen or sifter includes a wire mesh sheet 33 in a frame 34 resting on ledges 30 and 31.

The forward end of the screen and the frame extend under the rear end of the platform 20 while a screw 35 is threaded through the rear wall to engage over top of the rear end of the screen and the spring thereby holding this screen in place but allowing the same to be readily removed if desired.

A handle 36 is mounted to extend from the rear wall 7 by means of brackets 37 and has its ends slit or bifurcated as is indicated at 38 and between the extremities of the furcations there is mounted a grip 39. This grip is rotatably mounted on a pin 40 and has fixed to one end thereof a disk 41 with a crank 42.

A rod 43 is connected with the crank 42 and extends along the handle through suitable guide means 44 and is connected to an intermediate portion of a lever 45 pivotally engaged as at 46 with the end of the handle adjacent the rear wall 7.

A link 48 is connected with the lever 45 and extends through an opening in the rear wall 7, through the slot 19 of the arm 18 and is connected with the arm 28 of the slot 26. Thus it will be seen that by rocking the grip 39 the flap 26 may be rocked to an upstanding position or to a position lying on the platform 20.

A block 50 is fixed on the link 48 so that when the flap 26 is in an upstanding position and the plate 10 is in an open position the rocking of the grip to swing the flap down will cause the block 50 to engage the arm 18 and swing the plate 10 to a closed position so that the catch 24 will engage in the slot 16 of the keeper 15.

This latch 24 has a link 52 engaged therewith and this link 52 is slidable through a guide 53 on one of the brackets 37 and is connected with a trigger 54 pivotally mounted as at 55 in the handle 36.

A block 57 is mounted on the block 52 and a spring 58 is disposed about this link 52 between the block 57 and the guide 53 so as to hold the latch normally in an engaged or engageable position.

Obviously by rocking the trigger 54 the link 52 will be actuated to swing the latch to a releasing or released position so as to allow the plate 10 to swing downwardly of its own weight.

Brackets 60 project rearwardly and incline downwardly from the lower edge of the rear wall 7 and have rollers 61 journaled therein.

One practical way of using this structure would be to have the flap 26 in a down position that is lying along the inclined platform 20 as shown in dotted lines in Figure 3 and then the structure could be forced into the ashes as any ordinary shovel and then withdrawn it being preferable at that time to rock the grip so as to raise the flap. Then by shaking the structure that is by moving it back and forth on the floor using the roller 61 it will be seen that the smaller particles will sift through the screen 33 and collect on the plate 10.

Then the structure may be lifted over the receptacle or other place where it is desired to deposit the ashes and with the finger of one hand that is grasping the lower portion of the shovel handle the trigger 54 may be rocked so as to cause the latch 24 to be disengaged from the keeper 50 so that the plate 10 will gravitationally swing to an open position.

After the ashes have slid off the lid the same may be closed by rocking the grip which at the same time will lower the flap so that the material which remains on the screen may be slid off over the inclined platform 20 by tilting the device as will be apparent.

It is thought that the construction, operation, utility and advantages of this invention will now be clearly understood without any more detail description thereof.

The present embodiment of the invention has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A sifter shovel having an imperforated wedge shaped forward portion including upper and lower elements, a perforated portion forming, substantially, a continuation of said upper element, and a bottom hinged to said lower element and extending under the perforated portion, a handle, a rotatable grip in said handle, and means operatively connecting the rotatable grip and the bottom whereby said bottom may be swung to closed position by rotation of said grip.

2. A sifter shovel having an imperforated wedge shaped forward portion including upper and lower elements, a perforated portion forming, substantially, a continuation of said upper element, and a bottom hinged to said lower element and extending under the perforated portion, a handle, a rotatable grip in said handle, and means operatively connecting the rotatable grip and the bottom whereby said bottom may be swung to closed position by rotation of said grip, a flap hingedly mounted on the upper element and means operatively connecting the flap with said rotatable grip so that said flap may be rocked by rotating said grip.

3. A sifter shovel having an imperforated wedge shaped forward portion including upper and lower elements, a perforated portion forming, substantially, a continuation of said upper element, and a bottom hinged to said lower element and extending under the perforated portion, a handle, a rotatable grip in said handle, and means operatively connecting the rotatable grip and the bottom whereby said bottom may be swung to closed position by rotation of said grip, a latch for holding said bottom in a closed position, a trigger on the handle, means operatively connecting the trigger and the latch whereby said trigger may be rocked to release said latch.

4. A sifter shovel having an imperforated wedge shaped forward portion including upper and lower elements, a perforated portion forming, substantially, a continuation of said upper element, and a bottom hinged to said lower element and extending under the perforated portion, a handle, a rotatable grip in said handle, and means operatively connecting the rotatable grip and the bottom whereby said bottom may be swung to closed position by rotation of said grip, a flap hingedly mounted on the upper element and means operatively connecting the flap with said rotatable grip so that said flap may be rocked by rotating said grip, a latch for holding said bottom in a closed position, a trigger on the handle, means operatively connecting the trigger and the latch whereby said trigger may be rocked to release said latch.

5. A sifter shovel having an imperforated wedge shaped forward portion including upper and lower elements, a perforated portion forming, substantially, a continuation of said upper element, a bottom hinged to said lower element and extending under the perforated portion, an arm rigidly fixed to the bottom and having a slot, a link slidably mounted in the shovel and having a block, said link extending through the slot, and means for actuating the link to cause the block to engage the arm for swinging the bottom to a closed position.

6. A sifter shovel having an imperforated wedge shaped forward portion including upper and lower elements, a perforated portion forming, substantially, a continuation of said upper element, a bottom hinged to said lower element and extending under the perforated portion, an arm rigidly fixed to the bottom and having a slot, a link slidably mounted in the shovel and having a block, said link extending through the slot, a handle projecting from the shovel, a rotatable grip in the handle, a crank on the rotatable grip, a rod connected to the crank, a lever rockable on the handle with an intermediate portion of which the rod is connected, said link being connected with said lever to be shifted thereby when the grip is rocked.

7. A sifter shovel having an imperforated wedge shaped forward portion including upper and lower elements, a perforated portion forming, substantially, a continuation of said upper element, a bottom hinged to said lower element and extending under the perforated portion, an arm rigidly fixed to the bottom and having a slot, a link slidably mounted in the shovel and having a block, said link extending through the slot, a handle projecting from the shovel, a rotatable grip in the handle, a crank on the rotatable grip, a rod connected to the crank, a lever rockable on the handle with an intermediate portion of which the rod is connected, said link being connected with said lever to be shifted thereby when the grip is rocked, a flap rockably mounted on the upper element, an arm projecting from the flap with which said link is connected.

8. A sifter shovel of the class described including a perforated element and a bottom hinged below said perforated element, a handle, a grip rockably mounted in the handle, and means operatively connecting the grip and the botom to cause the swinging of the bottom to a closed position by rocking said grip.

In testimony whereof I affix my signature.

CALOGERO CIPRIANO.